United States Patent
Zhou et al.

(10) Patent No.: US 11,915,354 B2
(45) Date of Patent: Feb. 27, 2024

(54) AUTOMATED GIF GENERATION PLATFORM

(71) Applicant: Snap Inc., Santa Monica, CA (US)

(72) Inventors: Kai Zhou, Wr Neudorf (AT); Kenneth Au, Edmonton (CA)

(73) Assignee: Snap Inc., Santa Monica, CA (US)

( * ) Notice: Subject to any disclaimer, the term of this patent is extended or adjusted under 35 U.S.C. 154(b) by 64 days.

(21) Appl. No.: 17/555,762

(22) Filed: Dec. 20, 2021

(65) Prior Publication Data

US 2023/0196647 A1 Jun. 22, 2023

(51) Int. Cl.
| | |
|---|---|
| G06T 13/40 | (2011.01) |
| G06F 16/903 | (2019.01) |
| G06V 20/30 | (2022.01) |
| H04L 67/50 | (2022.01) |
| G06F 18/21 | (2023.01) |
| G06T 19/00 | (2011.01) |

(52) U.S. Cl.
CPC ........ *G06T 13/40* (2013.01); *G06F 16/90335* (2019.01); *G06F 18/21* (2023.01); *G06T 19/006* (2013.01); *G06V 20/30* (2022.01); *H04L 67/535* (2022.05)

(58) Field of Classification Search
CPC . G06T 13/40; G06T 19/006; G06F 16/90335; G06F 18/21; G06V 20/30; H04L 67/535
See application file for complete search history.

(56) References Cited

U.S. PATENT DOCUMENTS

| | | | |
|---|---|---|---|
| 11,490,036 B1 * | 11/2022 | Uavechanichkul | ......................... H04N 21/41407 |
| 2007/0103470 A1 | 5/2007 | Han et al. | |
| 2010/0207950 A1 | 8/2010 | Zhao et al. | |
| 2017/0133054 A1 * | 5/2017 | Song | ...................... G11B 27/28 |
| 2021/0173863 A1 * | 6/2021 | Collins | ................. G06F 16/435 |
| 2021/0335350 A1 | 10/2021 | Ribas Machado Das Neves et al. | |
| 2023/0139824 A1 * | 5/2023 | Mittal | .................... G06N 20/00 705/7.29 |

FOREIGN PATENT DOCUMENTS

| | | |
|---|---|---|
| WO | 2014188235 | 11/2014 |
| WO | 2023122595 | 6/2023 |

OTHER PUBLICATIONS

"International Application Serial No. PCT/US2022/082028, International Search Report dated Mar. 7, 2023", 3 pgs.

(Continued)

*Primary Examiner* — Jin Cheng Wang
(74) *Attorney, Agent, or Firm* — Schwegman Lundberg & Woessner, P.A.

(57) ABSTRACT

A system and a method for generating an automated GIF file generation system is described. In one aspect, the method includes accessing an animated GIF file, identifying a plurality of elements displayed in the animated GIF file, applying a variation of one or more elements to the animated GIF file, and generating a variant animated GIF file by applying the variation of the one or more elements to the animated GIF file. The system measures a trending metric of the variant animated GIF file based on a number of times the variant animated GIF file is shared on the communication platform and uses the trending metric as a feedback to generating the variant animated GIF file.

20 Claims, 14 Drawing Sheets

(56) References Cited

OTHER PUBLICATIONS

"International Application Serial No. PCT/US2022/082028, Written Opinion dated Mar. 7, 2023", 5 pgs.
Constine, Josh, "Morphin instantly Deepfakes your face into GIFs", TechCrunch, [Online] Retrieved from the Internet: <URL: https://techcrunch.com/2019/03/20/morphin-avatars/?guccounter=1>, (Mar. 20, 3019), 3 pgs.

* cited by examiner

AUTOMATED GIF GENERATION PLATFORM

TECHNICAL FIELD

The subject matter disclosed herein generally relates to generating an animated image. Specifically, the present disclosure addresses systems and methods for dynamically generating a variation of an animated image.

BACKGROUND

Animated Graphics Interchange Format (GIF) files have become popular as they are being increasingly shared among users of communication platforms. While the acronym GIF refers to an image encoding format (i.e., Graphics interchange Format, as noted above), the term GIF is often also used to refer to the displayed images themselves.

There are two types of GIFs: static GIFs and animated GIFs. A static GIF is a single frame GIF that when viewed is a still image. An animated GIF includes a plurality of frames in a single animated image file and is described by its own graphic control extension. The frames of an animated GIF are presented in a specific order or sequence. Animated GIFs can display the sequence of frames once, stopping when the last frame is displayed, or can also loop endlessly or stop after a few sequences.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
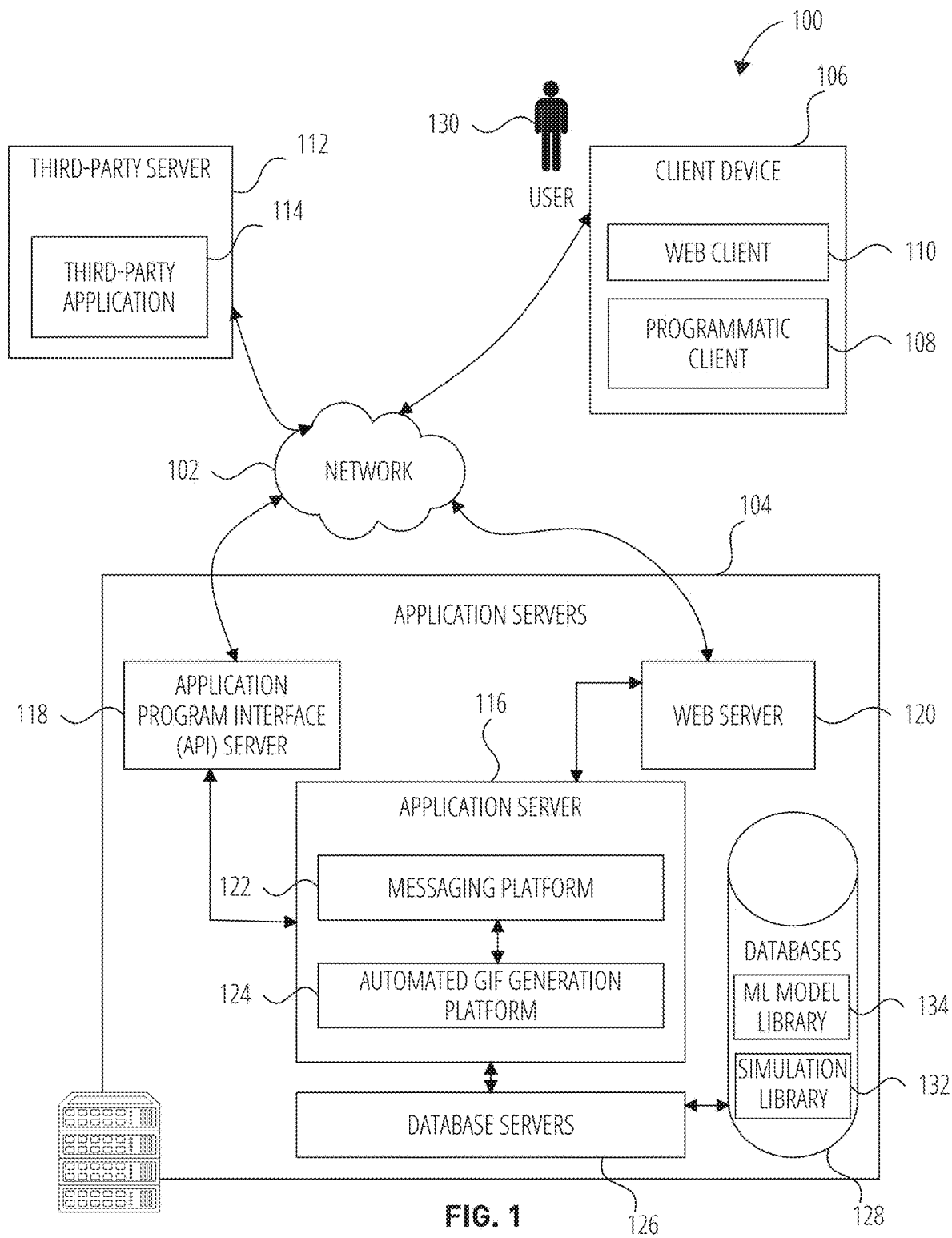
FIG. 1 is a diagrammatic representation of a networked environment in which the present disclosure is deployed, in accordance with some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural Components, such as modules) are optional and may be combined or subdivided, and operations (e.g., in a procedure, algorithm, or other function) may vary in sequence or be combined or subdivided.

The term "GIF" or "GIF file" is used herein to refer to an image encoding format or a file encoded with that format (e.g., Graphics Interchange Format). For example, the acronym GIF refers to the image encoding format. The term GIF is often also used to refer to the displayed images themselves. The GIF file supports animations.

The term "element" is used herein to refer to a visual characteristic of the GIF file. Examples of elements include a visual environment or a setting (e.g., a street, a park, a room, an arena, and so forth), a human model (e.g., a male or female character, a non-human character), a camera trajectory (e.g., movement of a camera, a point of view, an orientation), an animation (e.g., dancing moves, walking, running), an augmented reality visual effect (e.g., rain added to the picture), a text (e.g., annotations).

The term "variant" is used herein to refer to a variation of content (e.g., one or more elements) from an original GIF file. An example of a variant of a GIF file includes a modified background (e.g., scenery) of the original GIF file. Another example of a variant of a GIF file includes an augmented reality visual effect applied to the original GIF file (e.g., virtual leaves falling).

The term "communication platform" is used herein to refer to an application that enables users to communicate with each other. Examples of communication platform includes a social network platform, a messaging application, an email application, and other applications that enables users to share content with one another.

The term "augmented reality" (AR) is used herein to refer to an interactive experience of a real-world environment where physical objects that reside in the real-world are "augmented" or enhanced by computer-generated digital content (also referred to as virtual content or synthetic content). AR can also refer to a system that enables a combination of real and virtual worlds, real-time interaction, and 3D registration of virtual and real objects. A user of an AR system perceives virtual content that appear to be attached or interact with a real-world physical object.

The term "virtual reality" (VR) is used herein to refer to a simulation experience of a virtual world environment that is completely distinct from the real-world environment.

Computer-generated digital content is displayed in the virtual world environment. VR also refers to a system that enables a user of a VR system to be completely immersed in the virtual world environment and to interact with virtual objects presented in the virtual world environment.

The present application describes a method for generating a character motion (e.g., a human dancing) in diverse virtual environments, using different number(s) of 3D human models, controlling camera movement for capture, with various augmented reality (AR) effect(s). The simulated images together with texts, are utilized to produce an animated image (Graphics Interchange Format (GIF), webm, webp, mp4 etc.), which can be distributed to other users of a communication platform.

An automated GIF generation platform takes a trending animated image as input and parses its annotations, segments image background and human animation. The GIF generation platform changes a combination of elements (e.g., "environment", "human model(s)", "camera trajectory", "human animation", or "AR effect(s)") to produce numerous animated images that are similar/relevant to the trending input image. The distribution of these variants (also referred to as "peripheral" images) helps to increase its popularity. The GIF generation platform learns from the results which element(s) make the dominant contributions to help the further distribution of popular animated images.

In one example embodiment, the present application describes a system and a method for generating an automated GIF file generation system. In one aspect, the method includes accessing an animated GIF file, identifying a plurality of elements displayed in the animated GIF file, applying a variation of one or more elements to the animated GIF file, and generating a variant animated GIF file by applying the variation of the one or more elements to the animated GIF file. The system measures a trending metric of the variant animated GIF file based on a number of times the variant animated GIF file is shared on the communication platform. The system then uses the trending metric as a feedback to generating the variant animated GIF file.

As a result, one or more of the methodologies described herein facilitate solving the technical problem of generating a variant animated GIF file based on trending metrics feedback. The presently described method provides an improvement to an operation of the functioning of a computer by applying a variation to one or more elements of the animated GIF file and using a machine learning model to generate a variant animated GIF file. Furthermore, one or more of the methodologies described herein may obviate a need for certain efforts or computing resources. Examples of such computing resources include Processor cycles, network traffic, memory usage, data storage capacity, power consumption, network bandwidth, and cooling capacity.

FIG. 1 is a diagrammatic representation of a network environment 100 in which some example embodiments of the present disclosure may be implemented or deployed. One or more application servers 104 provide server-side functionality via a network 102 to a networked user device, in the form of a client device 106. A user 130 operates the client device 106. The client device 106 includes a web client 110 (e.g., a browser operating a web version of a communication platform such as messaging platform 122), a programmatic client 108 (e.g., a client-side communication application of the messaging platform 122) that is hosted and executed on the client device 106. In one example embodiment, the programmatic client 108 includes a social network application.

An Application Program Interface (API) server 118 and a web server 120 provide respective programmatic and web interfaces to application servers 104. A specific application server 116 hosts a messaging platform 122 and an automated gif generation platform 124. Both the messaging platform 122 and the automated gif generation platform 124 include components, modules and/or applications.

The messaging platform 122 includes a communication application that enables users to communicate with other users by sharing, sending, receiving content in messages. Examples of communication applications includes social network messaging application, texting application, email application, web-based content sharing application, and so forth.

The automated gif generation platform 124 accesses content (e.g., messages) from the messaging platform 122. In one example, the automated gif generation platform 124 identifies trending content (e.g., GIF file) based on content being shared using the messaging platform 122. In one example, a trending content includes content that is shared at an increasing (e.g., exponential) rate within a predefined period of time (e.g., within the last 24 hours). In one example, a trending metric is used to measure the sharing rate (e.g., the number of repost within the last 24 hours). The trending metric can include geometrical, age group, gender group cluster of users trending, multiple selection trend of single user trending (e.g. user selects multiple times of one specific ethnicity of a character in variant animated GIFs). After the automated gif generation platform 124 identifies a top trending GIF file, the automated gif generation platform 124 parses the top trending GIF file to identify visual characteristics and elements in the file.

In one example embodiment, the automated gif generation platform 124 trains a machine learning model based on features of the GIF files to identify the different visual characteristics or elements. The automated gif generation platform 124 stores the machine learning model library 134 in databases 128. The features may include keywords, labels, visual characteristics, object recognition, motion, background scene, camera motion, and so forth. The automated gif generation platform 124 uses the machine learning model to identify and classify each visual element of the GIF file.

In one example embodiment, the automated gif generation platform 124 uses the machine learning model library 134 to identify different elements in the GIF file. The automated gif generation platform 124 accesses other variations of an identified element of the GIF file from the simulation library 132. The automated gif generation platform 124 applies the variation of the element to the GIF file to generate one or more variant GIF files. For example, the automated gif generation platform 124 retrieves a different scenic background from the simulation library 132 and applies the scenic background to the GIF file by changing the background of the original GIF file to the scenic background selected by the automated gif generation platform 124. The automated gif generation platform 124 publishes the variant GIF files on the messaging platform 122 and measures the trending metric for each variant GIF file. The automated gif generation platform 124 can then identify variants that have a high trending metric (e.g., greater than the metric of the original GIF file), and identify which element variations are associated with the variants having high trending metric. The automated gif generation platform 124 can then recommend the user 130 to apply these identified variations to another GIF file.

The application server 116 is shown to be communicatively coupled to database servers 126 that facilitates access to an information storage repository or databases 128. In one example embodiment, the databases 128 includes storage devices that store content (e.g., GIF images, animation models, simulation models, ML models) to be processed by the automated gif generation platform 124. For example, the databases 128 include the simulation library 132 and the machine learning model library 134.

Additionally, a third-party application 114 executing on a third-party server 112, is shown as having programmatic access to the application server 116 via the programmatic interface provided by the Application Program Interface (API) server 118. For example, the third-party application 114, using information retrieved from the application server 116, may supports one or more features or functions on a website hosted by the third party. For example, the third-party application 114 includes another communication platform that is distinct from the messaging platform 122.

Figure 2:
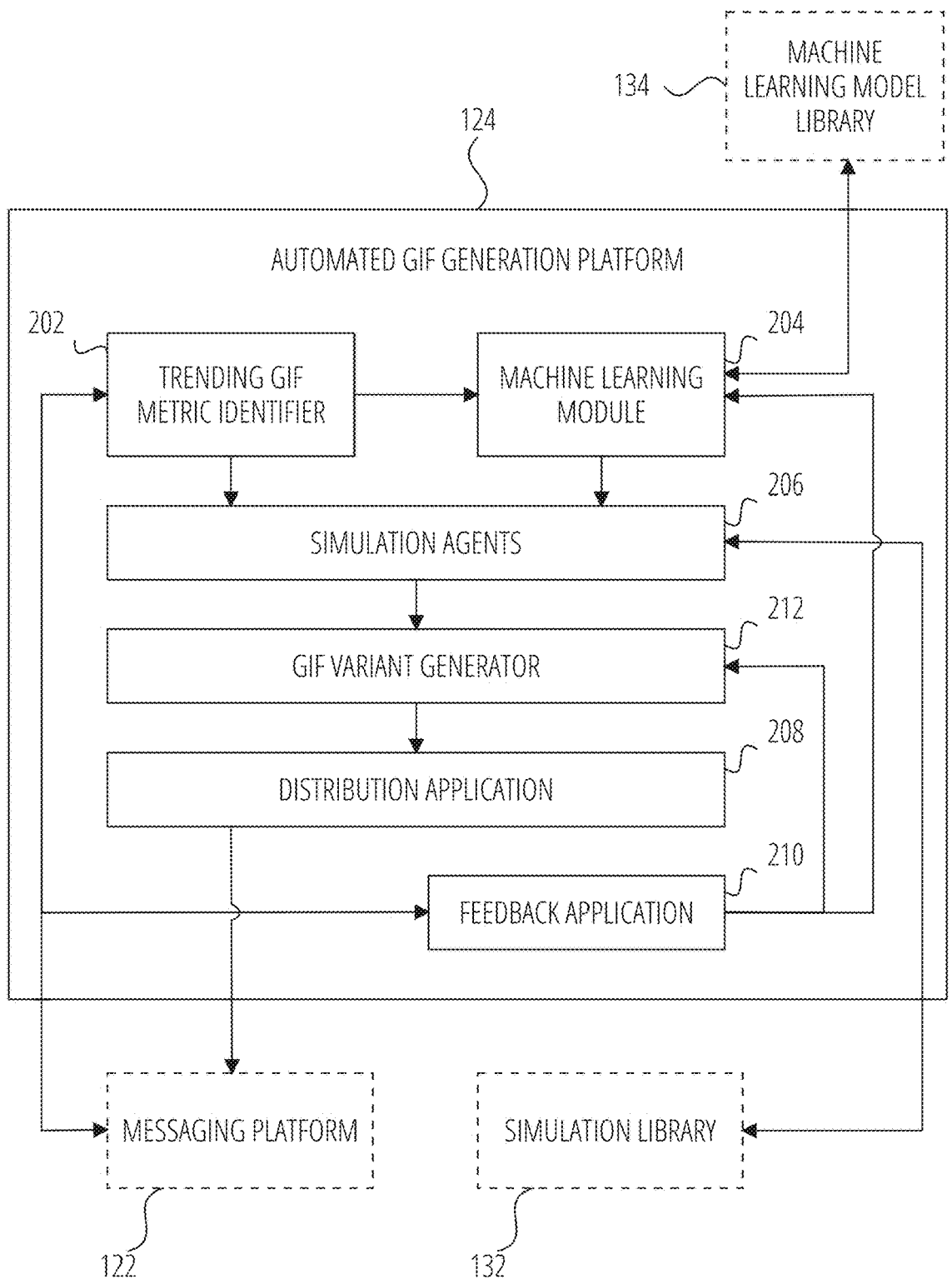
FIG. 2 is a block diagram illustrating an automated GIF generation platform in accordance with one example embodiment.

FIG. 2 is a block diagram illustrating the automated gif generation platform 124 in accordance with one example embodiment. The automated gif generation platform 124 includes a trending GIF metric identifier 202, a machine learning module 204, a simulation agents 206, a distribution application 208, a feedback application 210, a GIF variant generator 212, and a machine learning model library 134.

The trending GIF metric identifier 202 measures a trending metric for each GIF file that are shared on the messaging platform 122. For example, the trending metric measures the number of times a specific GIF file has been shared, reposted, sent, received, and so forth on the messaging platform 122 (and on other messaging applications or platforms) within a preset period of time (e.g., last 24 hours). In other examples, the trending GIF metric identifier 202 measures a rate of change of the trending metric to determine whether a particular GIF file is trending (e.g., the number of reposts is increasing) and identifies GIF files that have an increase rate change exceeding a preset threshold (e.g., reposts increased over 150% change threshold over the last 6 hours). In another example, the trending GIF metric identifier 202 identifies top trending GIF files based on their corresponding trending metric and rate change.

The trending GIF metric identifier 202 identifies a trending GIF file (also referred to as original GIF file) and provides the trending GIF file to the machine learning module 204. The machine learning module 204 parses the trending GIF file to identify visual characteristics and elements of the trending GIF file. For example, the machine learning module 204 accesses trained machine learning models from the machine learning model library 134 to identify elements such as a background/segment image environment, a character/person, an animation or motion of the character, a camera trajectory, text/annotations, and visual effects (e.g., AR effects) the trending GIF file.

The simulation agents 206 retrieves a variation of an element from the simulation library 132 and applies the variation to the original GIF file. For example, the simulation agents 206 retrieves a female human model and a beach background model from the simulation library 132 and replaces the character and the background in the original GIF file with the female human model and the beach background. In another example, the simulation agents 206 applies a combination of variations of one or more elements to original GIF file to generate different GIF files (also referred to as variants or variations of the original GIF file).

The GIF variant generator 212 generates the different GIF files or variants based on the output from the simulation agents 206. In one example, the GIF variant generator 212 generates one or more variants. In another example, the GIF variant generator 212 generates a first set of variants for distribution on a first messaging platform and a second set of variants for distribution on a second messaging platform. In another example, the GIF variant generator 212 generates a set of variants based on the most popular variations of a corresponding element (e.g., beach background is the most popular). The popularity of a variation of an element of a GIF file may be determined based on the trending metric of the corresponding file.

The distribution application 208 distributes the variants on the messaging platform 122. In one example, the distribution application 208 requests the messaging platform 122 to distribute a first set of variants and another messaging platform to distribute a second set of variants. In another example, the distribution application 208 requests the messaging platform 122 to distribute a set of variants and another messaging platform to distribute the same set of variants.

The feedback application 210 accesses the trending metric of each distributed variant from the trending GIF metric identifier 202 and identifies top variants with top trending metrics. The feedback application 210 identifies variations of elements corresponding to the top variants. For example, the feedback application 210 determines that the most popular variants have in common a particular animation (e.g., dancing style) of characters among the variants. In another example, the feedback application 210 identifies which change to one or more specific elements (e.g., background and camera trajectory) are the most popular in the most popular variants using the machine learning module 204. In another example, the machine learning module 204 identifies the combination of elements changes associated with the top variants. The feedback application 210 instructs the GIF variant generator 212 to recommend a particular variant or element to change.

In one example, the messaging platform 122 detects that the user is about to repost or share a GIF file. In response, the automated gif generation platform 124 generates a dialog box on the messaging platform 122 that recommend sharing a variation of the GIF file on the messaging platform 122. The automated gif generation platform 124 provides a recommendation to the user of the messaging platform 122 to generate the variation of the GIF file based on application-recommended or user-selected element(s) variation(s).

Figure 3:
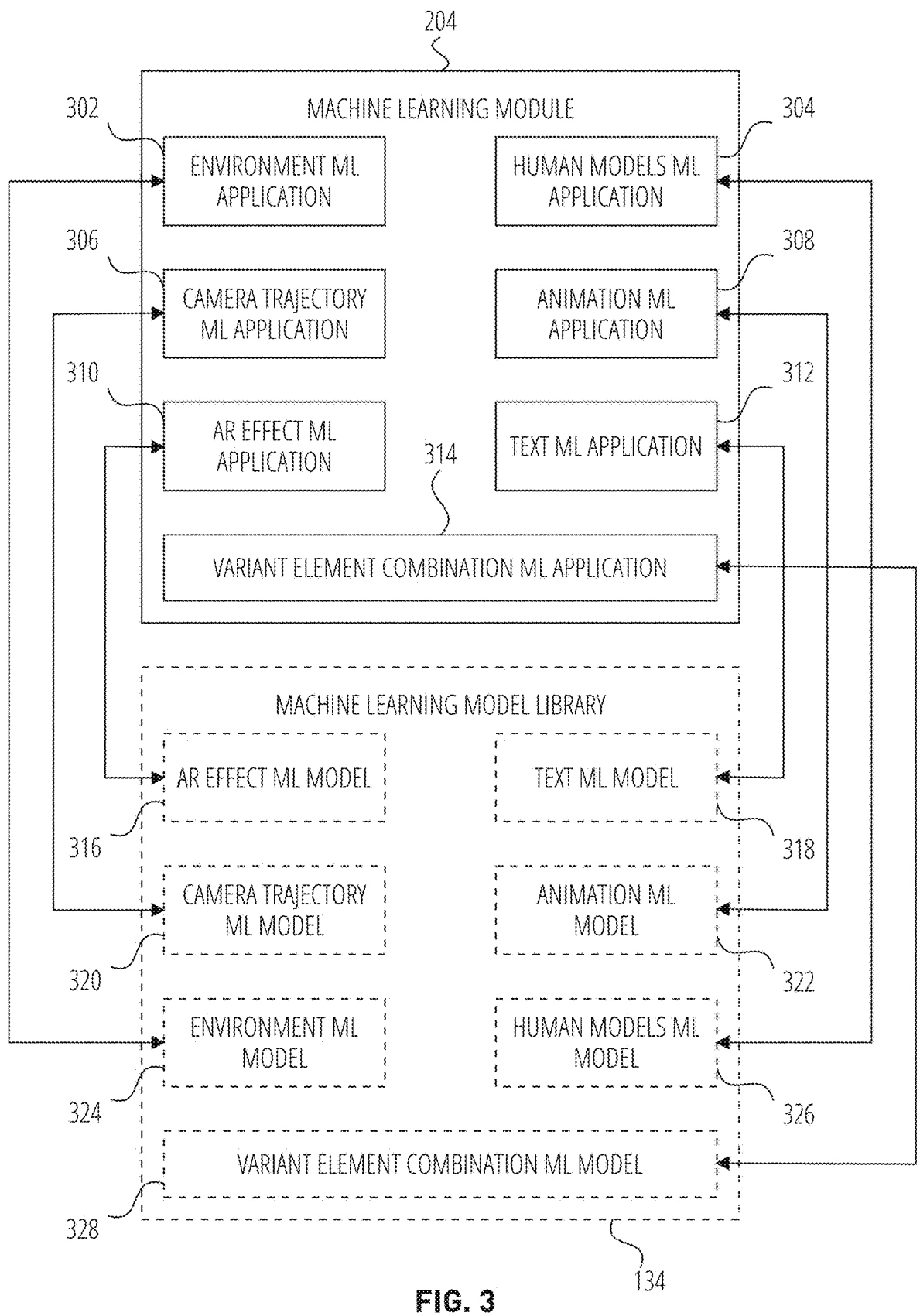
FIG. 3 is a block diagram illustrating a machine learning module in accordance with one example embodiment.

FIG. 3 is a block diagram illustrating a machine learning module 204 in accordance with one example embodiment. The machine learning module 204 includes an environment ML application 302, a human models ML application 304, a camera trajectory ML application 306, an animation ML application 308, an AR effect ML application 310, a text ML application 312, a variant element combination ML application 314. The machine learning model library 134 includes an AR effect ML model 316, a text ML model 318, a camera trajectory ML model 320, an animation ML model 322, an environment ML model 324, a human models ML model 326, and a variant element combination ML model 328. Those of ordinary skills in the art will recognize that the ML applications in the machine learning module 204 are not limited to the ones described below but can also include other ML applications.

The environment ML application 302 includes a machine-learning program that is dedicated to learning, detecting, and identifying background images of GIF files. In one example, the environment ML application 302 is trained to identify background images in GIF files (to distinguish a background scenery from a foreground character and to identify the background scenery such as a sunset). The environment ML application 302 trains an environment ML model 324.

The human models ML application 304 includes a machine-learning program that is dedicated to learning, detecting, and identifying characters in GIF files. In one example, the human models ML application 304 is trained to identify a foreground character in GIF files (to distinguish the character from the background scenery, and to identify the character as a male human). The human models ML application 304 trains a human models ML model 326.

The camera trajectory ML application 306 includes a machine-learning program that is dedicated to learning, detecting, and identifying camera trajectories in GIF files. In one example, the camera trajectory ML application 306 is trained to identify how a change in the point of view displayed in the original GIF file, or the trajectory of a camera that would generates the animation in the GIF files (e.g., panning from one side to another, rotating up and down). The camera trajectory ML application 306 trains an AR effect ML model 316.

The animation ML application 308 includes a machine-learning program that is dedicated to learning, detecting, and identifying animations of characters identified in GIF files. In one example, the animation ML application 308 is trained to identify a type of movement of the character (e.g., dancing style A, walking, running) displayed in GIF files. The animation ML application 308 trains an animation ML model 322.

The AR effect ML application 310 includes a machine-learning program that is dedicated to learning, detecting, and identifying visual effects in GIF files. In one example, the AR effect ML application 310 is trained to identify virtual effects animations (e.g., snowing, raining, falling leaves) displayed in GIF files. The AR effect ML application 310 trains an AR effect ML model 316.

The text ML application 312 includes a machine-learning program that is dedicated to learning, detecting, and identifying text and annotations in GIF files. In one example, the text ML application 312 is trained to identify text characters, emojis, and any other visual annotations (e.g., heart symbol) displayed in GIF files. In another example, the text ML application 312 identifies a word in a GIF file and identifies an alternative word (e.g., a synonym or another word of a similar category/context). The text ML application 312 trains a text ML model 318.

The variant element combination ML application 314 includes a machine-learning program that is dedicated to learning, detecting, and identifying elements, variations of elements, combinations of elements of top trending GIF files or top trending variants. In one example, the variant element combination ML application 314 is trained to identify a combinations of elements changes/variations of top trending variants. The variant element combination ML application 314 trains a machine learning model library 134.

Figure 4:
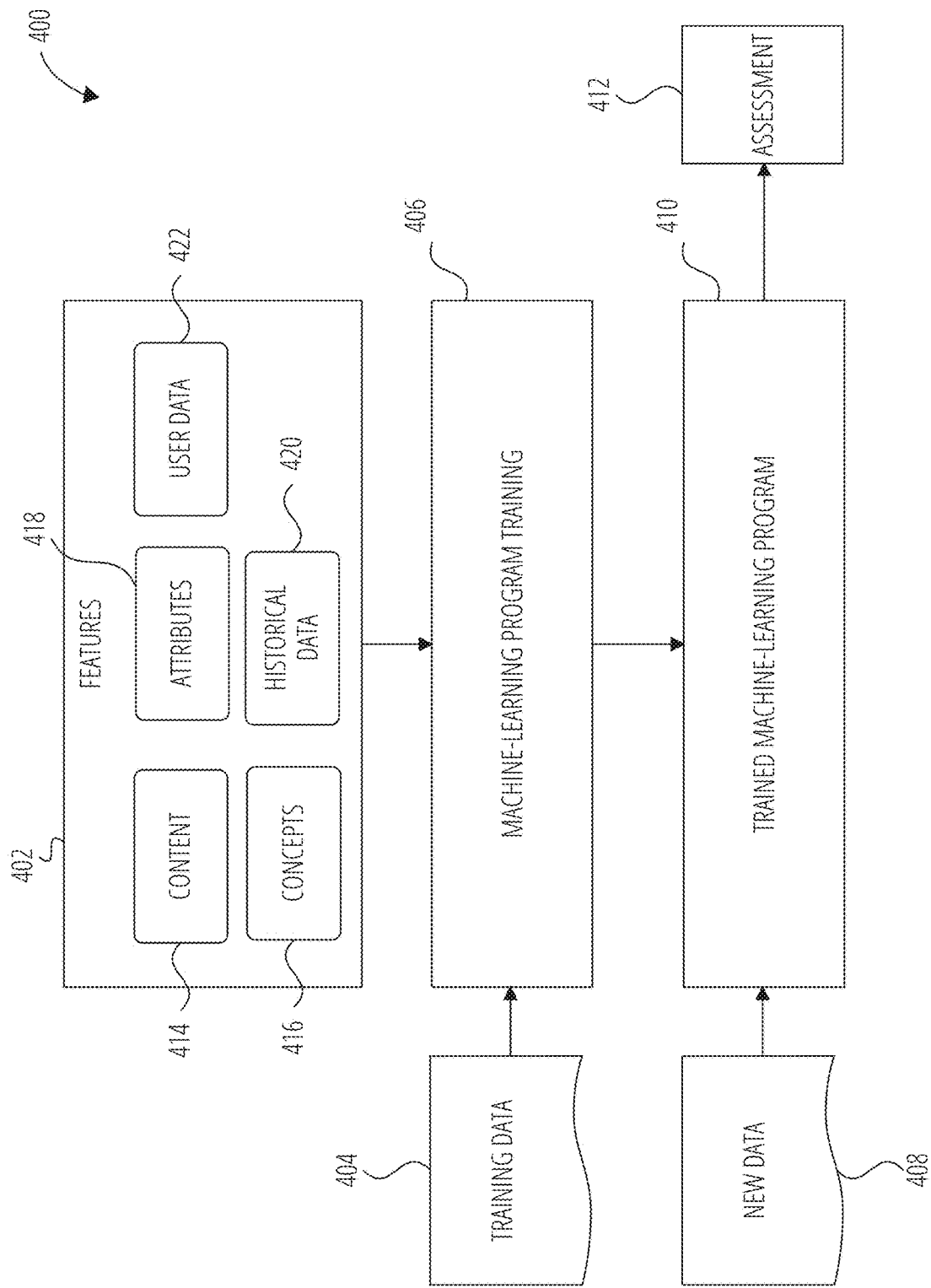
FIG. 4 is a block diagram illustrating training and using a machine-learning program, according to some example embodiments.

FIG. 4 illustrates training and use of a machine-learning program 400, according to some example embodiments. In some example embodiments, machine-learning programs (MLPs), also referred to as machine-learning algorithms or tools, are used to perform operations associated with searches, such as job searches.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 404 in order to make data-driven predictions or decisions expressed as outputs or assessments (e.g., assessment 412). Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine-learning algorithms use features 402 for analyzing the data to generate an assessment 412. Each of the features 402 is an individual measurable property of a phenomenon being observed. The concept of a feature is related to that of an explanatory variable used in statistical techniques such as linear regression. Choosing informative, discriminating, and independent features is important for the effective operation of the MLP in pattern recognition, classification, and regression. Features may be of different types, such as numeric features, strings, and graphs.

In one example embodiment, the features 402 may be of different types and may include one or more of content 414, concepts 416, attributes 418, historical data 420 and/or user data 422, merely for example.

The machine-learning algorithms use the training data 404 to find correlations among the identified features 402 that affect the outcome or assessment 412. In some example embodiments, the training data 404 includes labeled data, which is known data for one or more identified features 402 and one or more outcomes, such as detecting communication patterns, detecting the meaning of the message, generating a summary of a message, detecting action items in messages detecting urgency in the message, detecting a relationship of the user to the sender, calculating score attributes, calculating message scores, etc.

With the training data 404 and the identified features 402, the machine-learning tool is trained at machine-learning program training 406. The machine-learning tool appraises the value of the features 402 as they correlate to the training data 404. The result of the training is the trained machine-learning program 410.

When the trained machine-learning program 410 is used to perform an assessment, new data 408 is provided as an input to the trained machine-learning program 410, and the trained machine-learning program 410 generates the assessment 412 as output.

Figure 5:
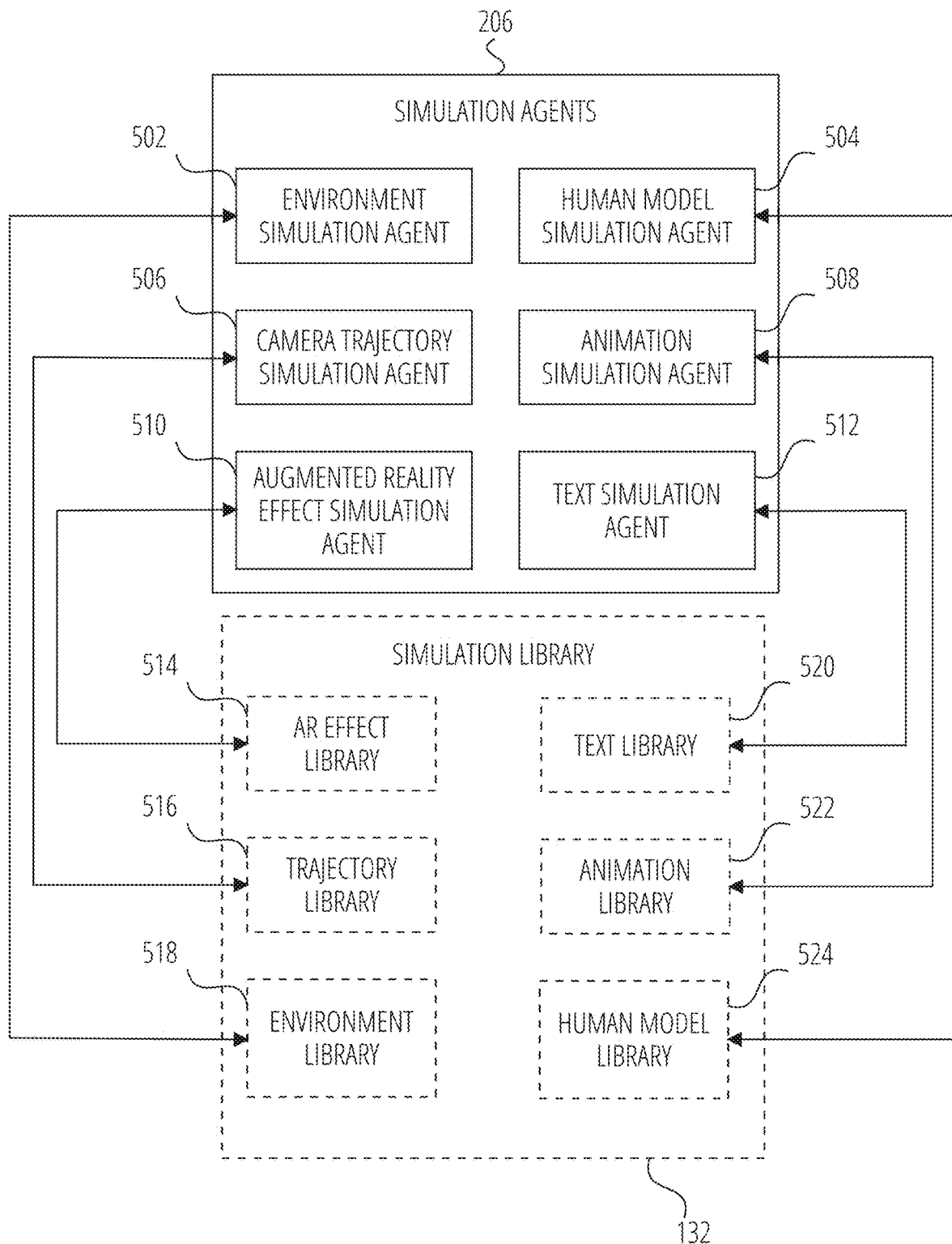
FIG. 5 is a block diagram illustrating simulation agents in accordance with one example embodiment.

FIG. 5 is a block diagram illustrating simulation agents 206 in accordance with one example embodiment. The simulation agents 206 includes an environment simulation agent 502, a human model simulation agent 504, a camera trajectory simulation agent 506, an animation simulation agent 508, an Augmented Reality effect simulation agent 510, a text simulation agent 512. The simulation library 132 includes an AR effect library 514, a trajectory library 516, an environment library 518, a text library 520, an animation library 522, and a human model library 524. Those of ordinary skills in the art will recognize that the agents of simulation agents 206 are not limited to the ones described below but can include other types of agents.

The environment simulation agent 502 accesses other environments or background variation (e.g., background images/scenes/models) from the environment library 518 and applies a variation of the environment to the corresponding element of the GIF file. For example, the environment simulation agent 502 retrieves a beach background scenery model from the environment library 518 and changes the visual background of the GIF file to the beach background scenery.

The human model simulation agent 504 accesses other character models (e.g., a female model, a male model, another human model) from the human model library 524 and applies a variation of the character model to the corresponding element of the GIF file. For example, the human model simulation agent 504 retrieves a female human model from the human model library 524 and replaces the male human model in the original GIF file with the female human model.

The camera trajectory simulation agent 506 accesses a camera trajectory model (e.g., panning left to right, hovering, first person view, zooming in and out) from the trajectory library 516 and applies a variation of the camera trajectory model to the corresponding element of the GIF file. For example, the camera trajectory simulation agent 506 retrieves a first person view model from the trajectory library 516 and applies the first person view model to the original GIF file. In one example, the camera trajectory simulation agent 506 manipulates the visual content of the original GIF file to modify the animation of the GIF file so as to appear as the first person view.

The animation simulation agent 508 accesses other animation models (e.g., running model, dancing move model, walking model) from the animation library 522 and applies a variation of the animation model to the corresponding element of the WE file. For example, the animation simulation agent 508 retrieves a dance move model from the animation library 522 and replaces the motion of the character model in the original GIF file with the dance move model.

The Augmented Reality effect simulation agent 510 accesses visual effect models (e.g., leaves falling effects, rain drops effects) from the AR effect library 514 and applies a variation of the visual effect to the corresponding element of the GIF file. For example, the Augmented Reality effect simulation agent 510 retrieves a rain drops effect from the AR effect library 514 and adds the visual rain drops effect to the original GIF file. In another example, the Augmented Reality effect simulation agent 510 replaces a visual effect (e.g., leaves falling) in the original GIF file with the visual rain drops effect to the original GIF file.

The text simulation agent 512 accesses text models or annotation models (e.g., synonym model, context-related terms model, graphics text model) from the text library 520 and applies a variation of the text model to the corresponding element of the GIF file. For example, the text simulation agent 512 retrieves a large animated font size from the text library 520 and changes the text in the original GIF file with the large animated font size. In another example, the text simulation agent 512 replaces a word in the original GIF file with another word (e.g., a synonym, an antonym, a context-related term) or another phrase (e.g., a quote).

Figure 6:
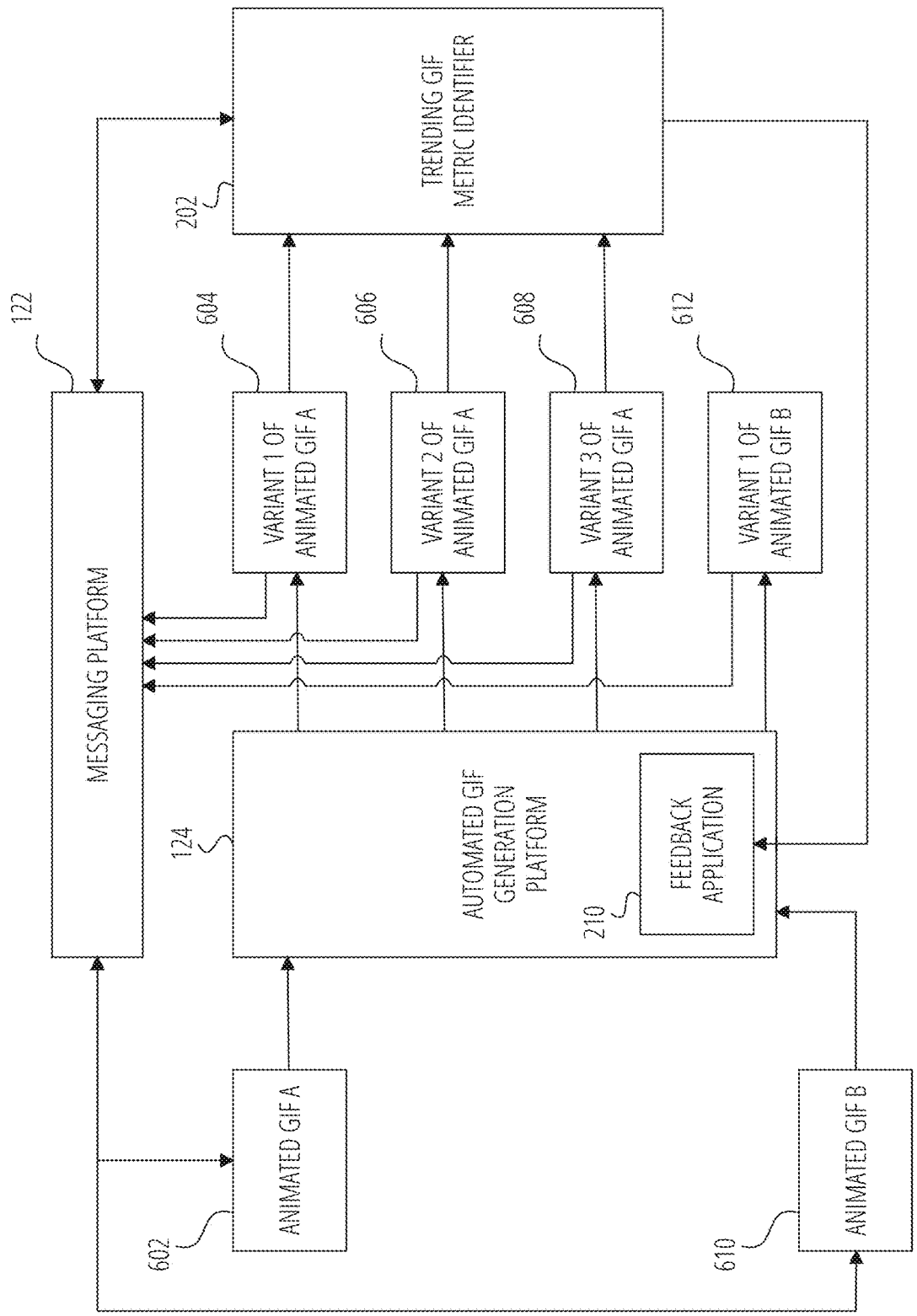
FIG. 6 is a block diagram illustrating an example operation of the automated GIF generation platform in accordance with one example embodiment.

FIG. 6 is a block diagram illustrating an example operation of the automated gif generation platform 124 in accordance with one example embodiment. The automated gif generation platform 124 identifies from a top trending GIF file (e.g., animated GIF A 602) that is trending on the messaging platform 122. The automated gif generation platform 124 parses visual elements of the animated GIF A 602 to identify various characteristics (e.g., background scenery, character, lighting, animation effects, camera effects, character moves).

In one example, the automated gif generation platform 124 modifies a first element (e.g., a human model) of animated GIF A 602 to generate variant 1 of animated GIF A 604. The automated gif generation platform 124 modifies a second element (e.g., an animation of a character) of animated GIF A 602 to generate variant 2 of animated GIF A 606. The automated gif generation platform 124 modifies a third element (e.g., a visual effect) of animated GIF A 602 to generate variant 3 of animated GIF A 608.

In another example, the automated gif generation platform 124 replaces an element of animated GIF A 602 with a first variation (e.g., dance move A) of the same element (e.g., character animation) to generate variant 1 of animated GIF A 604. The automated gif generation platform 124 replaces the element (e.g., character animation) of animated GIF A 602 with a second variation (e.g., dance move B) of the same element (e.g., character animation) to generate variant 2 of animated GIF A 606. The automated gif generation platform 124 replaces the element (e.g., character animation) of animated GIF A 602 with a third variation (e.g., dance move B) of the same element (e.g., character animation) to generate variant 3 of animated. GIF A 608.

The automated gif generation platform 124 publishes the variants (e.g., variant 1 of animated GIF A 604, variant 2 of animated GIF A 606, variant 3 of animated GIF A 608) on the messaging platform 122. In one example, the automated gif generation platform 124 recommends a user of the messaging platform 122 to publish one or more variants on the messaging platform 122. In another example, the automated gif generation platform 124 recommends a user of the messaging platform 122 to modify one or more elements of the animated GIF A 602. The automated gif generation platform 124 receives a selection of a variations of an element from the user. In another example, the automated gif generation platform 124 recommends one or more variations of one or more elements of the animated GIF A 602 to the user.

The trending GIF metric identifier 202 measures a trending metric for each variant (e.g., variant 1 of animated GIF A 604, variant 2 of animated GIF A 606, variant 3 of animated GIF A 608) from the messaging platform 122. The trending GIF metric identifier 202 identifies a top variant with a top trending metric. The feedback application 210 identifies characteristics of the top variant (e.g., which elements were changed, which variations were applied to which elements) and generates a top variation recommendation.

The trending GIF metric identifier 202 identifies another trending GIF file (e.g., animated GIF B 610) at a later time. The automated gif generation platform 124 recommends a user of the messaging platform 122 to apply the top variation recommendation to the animated GIF B 610. In another example, the automated gif generation platform 124 automatically applies the top variation recommendation to the animated GIF B 610 to generate a new variant (e.g., variant 1 of animated GIF B 612) of the animated GIF B 610 and publishes the new variant on the messaging platform 122.

Figure 7:
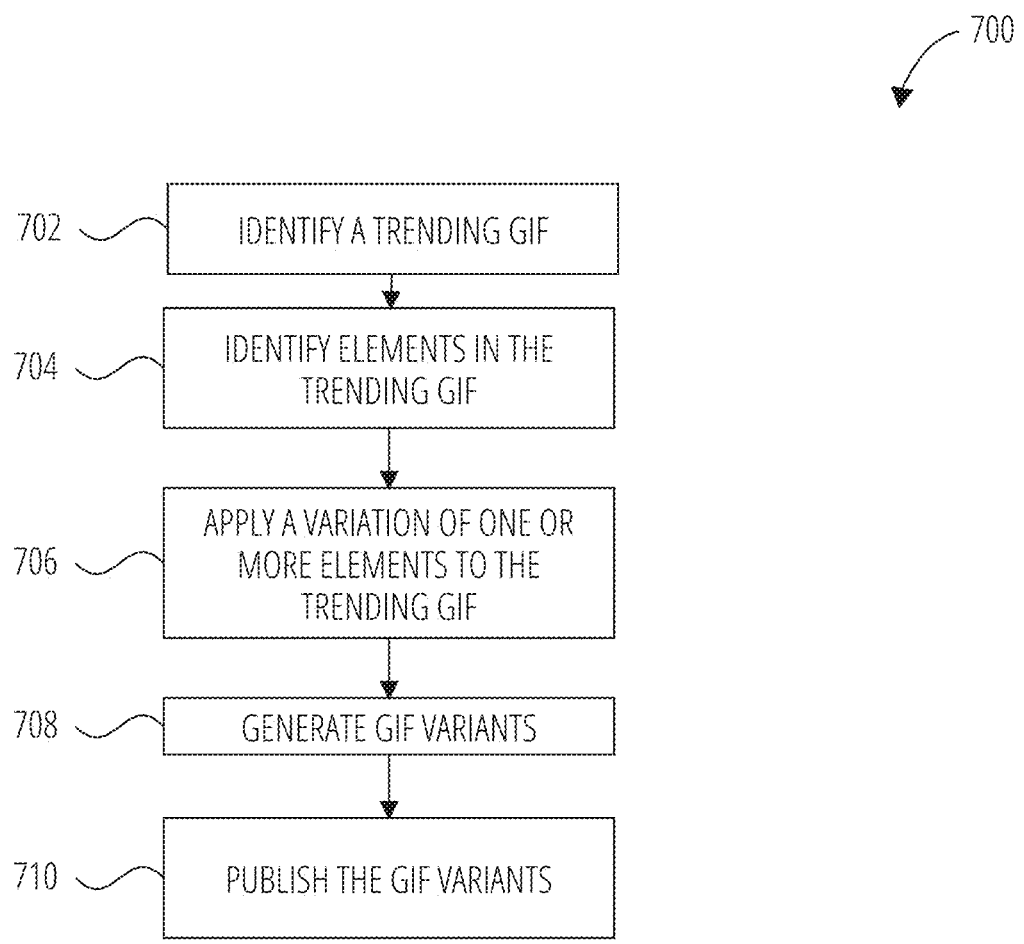
FIG. 7 is a flow diagram illustrating a method for generating GIF file variants in accordance with one example embodiment.

FIG. 7 is a flow diagram illustrating a method for generating GIF file variants in accordance with one example embodiment. Operations in the method 700 may be performed by the automated gif generation platform 124, using components (e.g., modules, engines) described above with respect to FIG. 2. Accordingly, the method 700 is described by way of example with reference to the automated gif generation platform 124. However, it shall be appreciated that at least some of the operations of the method 700 may be deployed on various other hardware configurations or be performed by similar components residing elsewhere. For example, part of the method 700 may be operated at the client device 106 or the third-party server 112.

In block 702, the trending GIF metric identifier 202 identities a trending GIF file from the messaging platform 122. In block 704, the simulation agents 206 identifies elements in the trending GIF file. In block 706, the simulation agents 206 applies a variation of one or more elements to the trending GIF file. In block 708, the GIF variant generator 212 generates GIF variants. In block 710, the distribution application 208 publishes the GIF variants on the messaging platform 122.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 8:
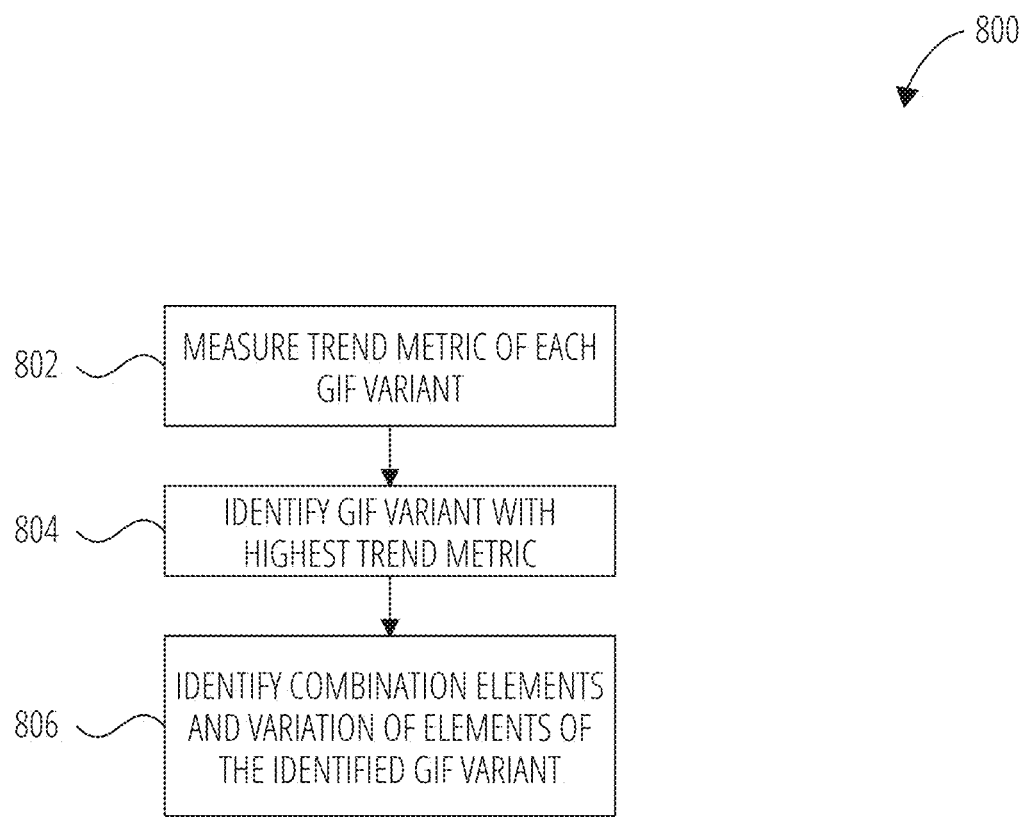
FIG. 8 is a flow diagram illustrating a method for identifying variation elements of a trending GIF file variant in accordance with one example embodiment.

FIG. 8 is a flow diagram illustrating a method for identifying variation elements of a trending GIF file variant in accordance with one example embodiment. Operations in the method 800 may be performed by the automated gif generation platform 124, using components (e.g., modules, engines) described above with respect to FIG. 2. Accordingly, the method 800 is described by way of example with reference to the automated gif generation platform 124. However, it shall be appreciated that at least some of the operations of the method 800 may be deployed on various other hardware configurations or be performed by similar components residing elsewhere. For example, part of the method 800 may be operated at the client device 106 or the third-party server 112.

In block 802, the trending GIF metric identifier 202 measures trend metric of each GIF variant. In block 804, the trending GIF metric identifier 202 identifies a GIF variant with highest trend metric. In block 806, the machine learning module 204 identifies a combination of elements and variation of elements of the identified GIF variant.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 9:
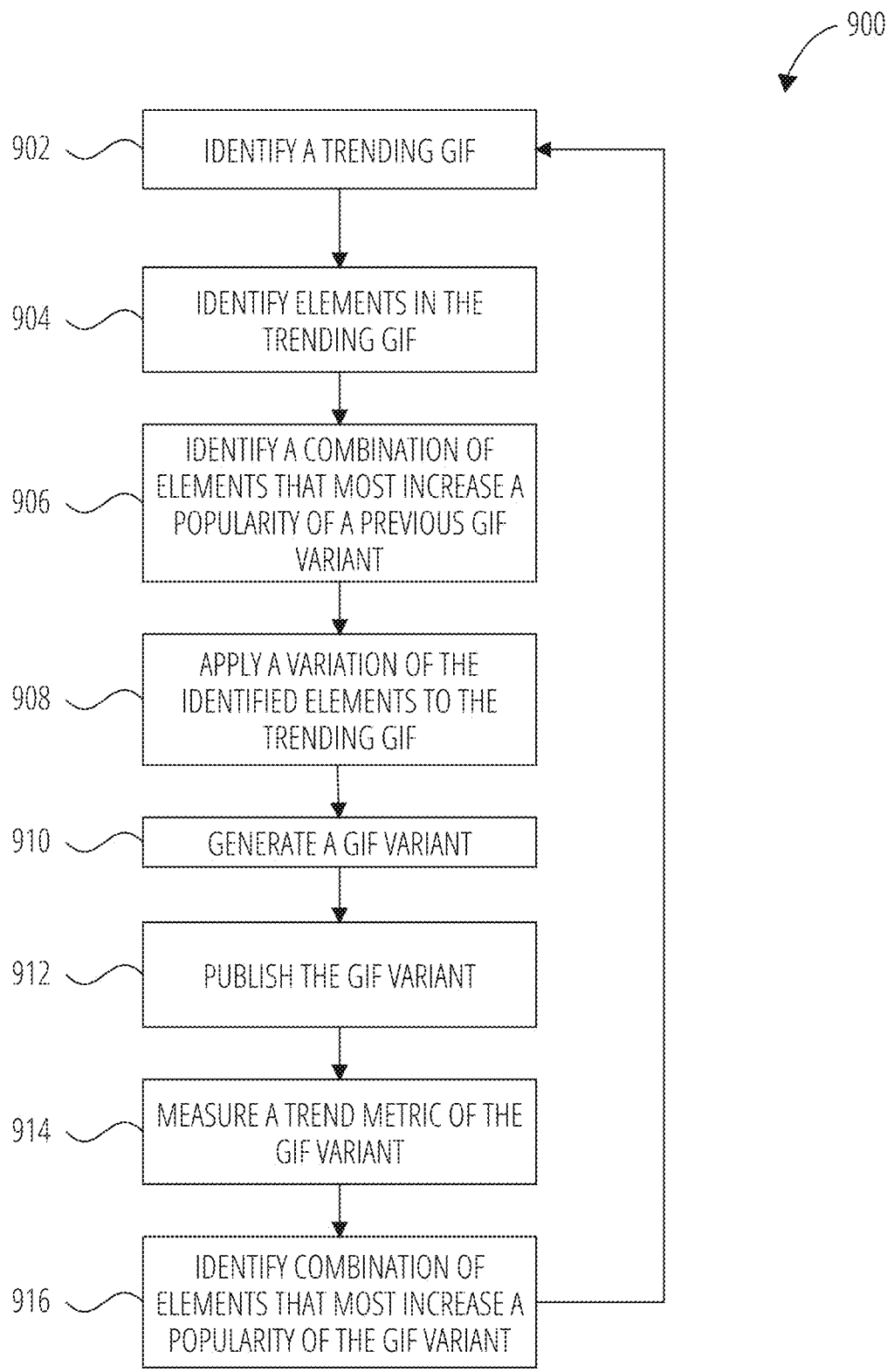
FIG. 9 is a flow diagram illustrating a method for identifying variation elements of a trending GIF file variant in accordance with one example embodiment.

FIG. 9 is a flow diagram illustrating a method for identifying variation elements of a trending GIF file variant in accordance with one example embodiment. Operations in the method 900 may be performed by the automated gif generation platform 124, using components (e.g., modules, engines) described above with respect to FIG. 2. Accordingly, the method 900 is described by way of example with reference to the automated gif generation platform 124. However, it shall be appreciated that at least some of the operations of the method 900 may be deployed on various other hardware configurations or be performed by similar components residing elsewhere. For example, part of the method 900 may be operated at the client device 106 or the third-party server 112.

In block 902, the trending GIF metric identifier 202 identifies a trending GIF. In block 904, the machine learning module 204 identifies elements in the trending GIF. In block 906, the machine IF a combination of elements that most increase a popularity of a previous GIF variant. In block 908, the simulation agents 206 applies a variation of the identified elements to the trending GIF. In block 910, the GIF variant generator 212 generates a new GIF variant. In block 912, the distribution application 208 publishes the new GIF variant. In block 914, the trending GIF metric identifier 202 measures a trend metric of the new GIF variant. In block 916, the machine learning module 204 identifies a combination of elements that most increase a popularity of the GIF variant.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 10:
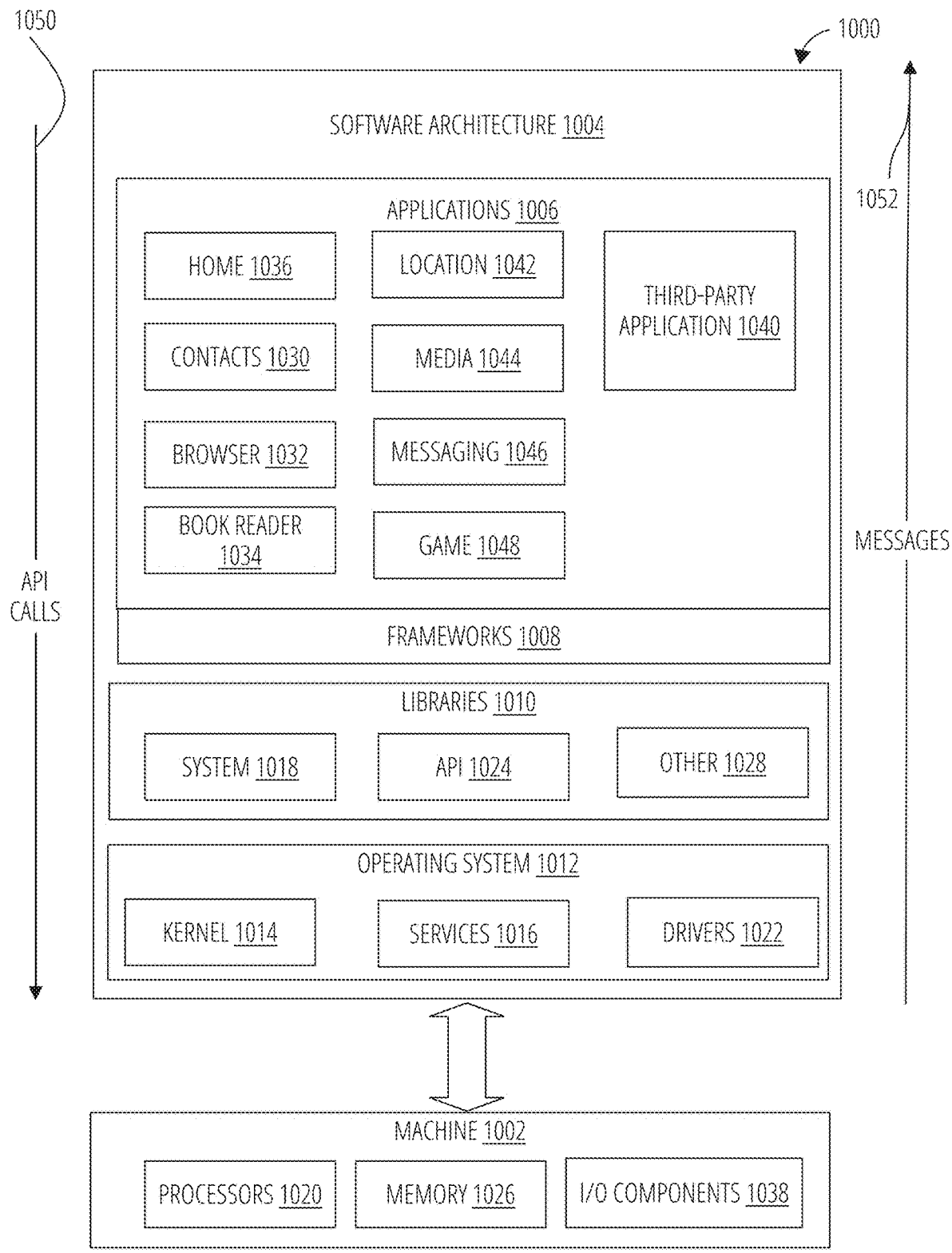
FIG. 10 is block diagram showing a software architecture within which the present disclosure may be implemented, according to an example embodiment.

FIG. 10 is block diagram 1000 showing a software architecture within which the present disclosure may be implemented, according to an example embodiment. The software architecture 1004 is supported by hardware such as a machine 1002 that includes Processors 1020, memory 1026, and I/O Components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, Processor management (e.g., scheduling), Component management, networking, and security settings, among other functionalities. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1010 provide a low-level common infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a high-level common infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example embodiment, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

Figure 11:
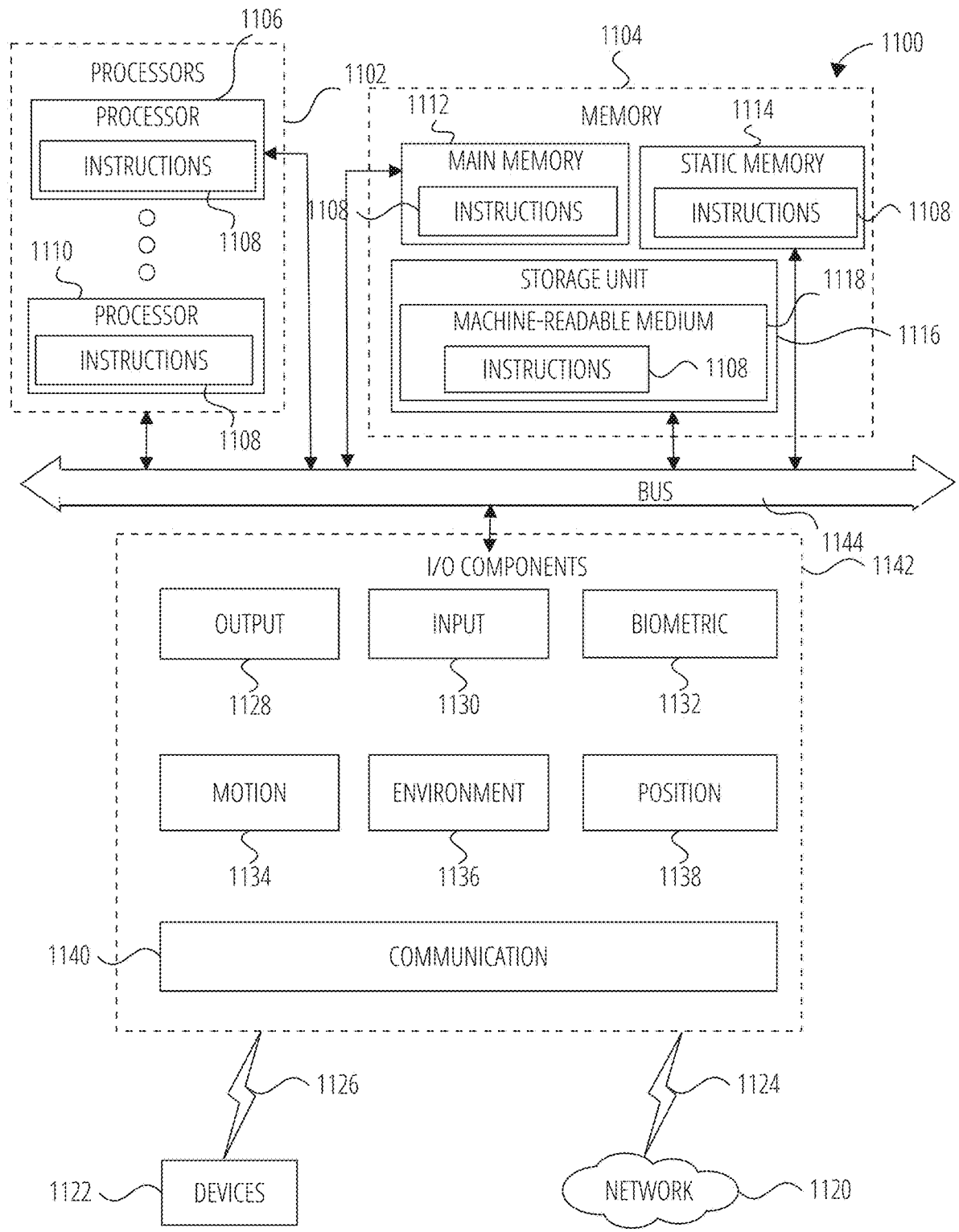
FIG. 11 is a diagrammatic representation of a machine in the form of a computer system within which a set of instructions may be executed for causing the machine to perform any one or more of the methodologies discussed herein, according to one example embodiment.

FIG. 11 is a diagrammatic representation of the machine 1100 within which instructions 1108 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein.

The machine 1100 may include Processors 1102, memory 1104, and I/O Components 1142, which may be configured to communicate with each other via a bus 1144. In an example embodiment, the Processors 1102 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1106 and a Processor 1110 that execute the instructions 1108. The term "Processor" is intended to include multi-core Processors that may comprise two or more independent Processors (sometimes referred to as "cores") that may execute instructions contemporaneously. Although FIG. 11 shows multiple Processors 1102, the machine 1100 may include a single Processor with a single core, a single Processor with multiple cores (e.g., a multi-core Processor), multiple Processors with a single core, multiple Processors with multiples cores, or any combination thereof.

The memory 1104 includes a main memory 1112, a static memory 1114, and a storage unit 1116, both accessible to the Processors 1102 via the bus 1144. The main memory 1104, the static memory 1114, and storage unit 1116 store the instructions 1108 embodying any one or more of the methodologies or functions described herein. The instructions 1108 may also reside, completely or partially, within the main memory 1112, within the static memory 1114, within machine-readable medium 1118 within the storage unit 1116, within at least one of the Processors 1102 (e.g., within the Processor's cache memory), or any suitable combination thereof, during execution thereof by the machine 1100.

The I/O Components 1142 may include a wide variety of Components to receive input, provide output, produce output, transmit information, exchange information, capture measurements, and so on. The specific I/O Components 1142 that are included in a particular machine will depend on the type of machine. For example, portable machines such as mobile phones may include a touch input device or other such input mechanisms, while a headless server machine will likely not include such a touch input device. It will be appreciated that the I/O Components 1142 may include many other Components that are not shown in FIG. 11. In various example embodiments, the I/O Components 1142 may include output Components 1128 and input Components 1130. The output Components 1128 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The input Components 1130 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O Components 1142 may include biometric Components 1132, motion Components 1134, environmental Components 1136, or position Components 1138, among a wide array of other Components. For example, the biometric Components 1132 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion Components 1134 include acceleration sensor Components (e.g., accelerometer), gravitation sensor Components, rotation sensor Components (e.g., gyroscope), and so forth. The environmental Components 1136 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The position Components 1138 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O Components 1142 further include communication Components 1140 operable to couple the machine 1100 to a network 1120 or devices 1122 via a coupling 1124 and a coupling 1126, respectively. For example, the communication Components 1140 may include a network interface Component or another suitable device to interface with the network 1120. In further examples, the communication Components 1140 may include wired communication Components, wireless communication Components, cellular communication Components, Near Field Communication (NFC) Components, Bluetooth® Components (e.g., Bluetooth® Low Energy), Wi-Fi® Components, and other communication Components to provide communication via other modalities. The devices 1122 may be another machine or any of a wide variety of peripheral devices (e.g., a peripheral device coupled via a USB).

Moreover, the communication Components 1140 may detect identifiers or include Components operable to detect identifiers. For example, the communication Components 1140 may include Radio Frequency Identification (RFID) tag reader Components, NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection Components (e.g., microphones to identify tagged audio signals). In addition, a variety of information may be derived via the communication Components 1140, such as location via Internet Protocol (IP) geolocation, location via Wi-Fi® signal triangulation, location via detecting an NFC beacon signal that may indicate a particular location, and so forth.

The various memories (e.g., memory 1104, main memory 1112, static memory 1114, and/or memory of the Processors 1102) and/or storage unit 1116 may store one or more sets of instructions and data structures (e.g., software) embodying or used by any one or more of the methodologies or functions described herein. These instructions (e.g., the instructions 1108), when executed by Processors 1102, cause various operations to implement the disclosed embodiments.

The instructions 1108 may be transmitted or received over the network 1120, using a transmission medium, via a network interface device (e.g., a network interface Component included in the communication Components 1140) and using any one of a number of well-known transfer protocols (e.g., hypertext transfer protocol (HTTP)). Similarly, the instructions 1108 may be transmitted or received using a transmission medium via the coupling 1126 (e.g., a peer-to-peer coupling) to the devices 1122.

As used herein, the terms "Machine-Storage Medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of Machine-Storage Media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "Machine-Storage Media," "computer-storage media," and "device-storage media" specifically exclude carrier waves, modulated data signals, and other such media, at least some of which are covered under the term "signal medium" discussed below.

The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1416 for execution by the machine 1400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "Computer-Readable Medium," and "device-readable medium" mean the same thing and may be used interchangeably in this disclosure. The terms are defined to include both Machine-Storage Media and transmission media. Thus, the terms include both storage devices/media and carrier waves/modulated data signals.

Figure 12:
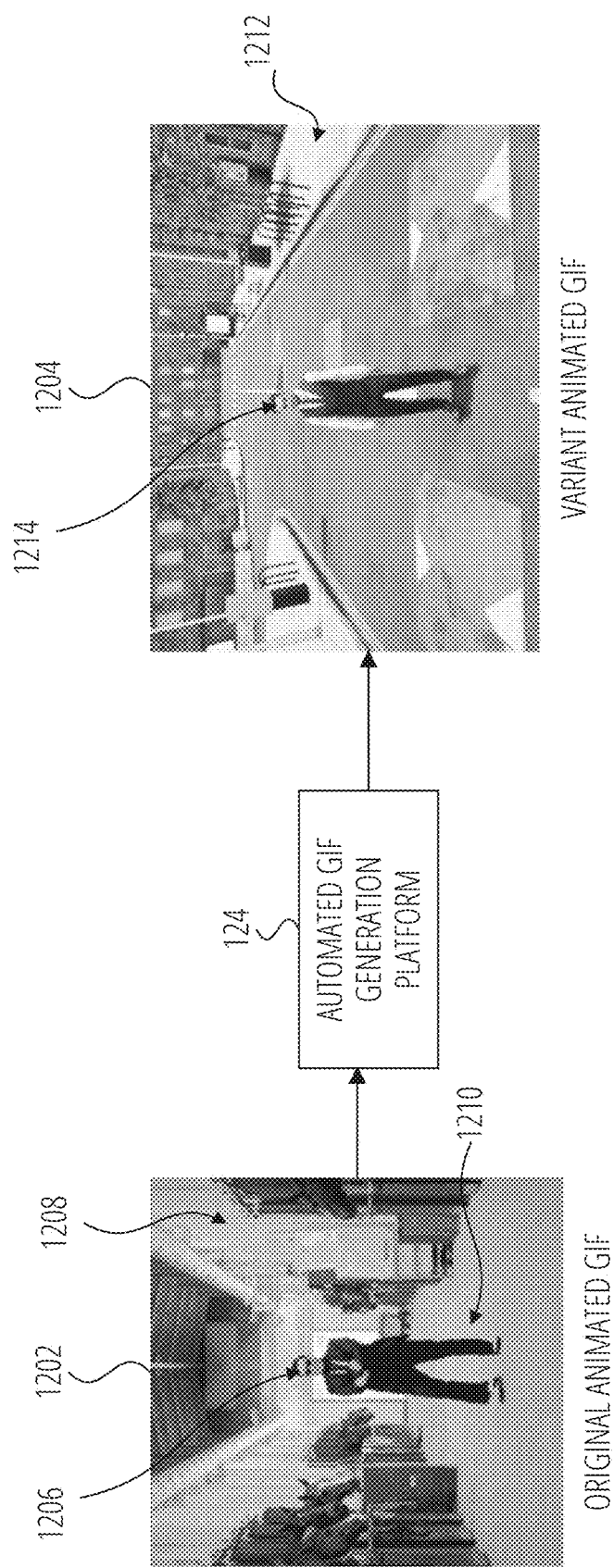
FIG. 12 illustrates an example of a variant GIF file in accordance with one example embodiment.

FIG. 12 illustrates an example of a variant GIF file in accordance with one example embodiment. The original animated GIF 1202 includes different elements/characteristics (e.g., character 1206, background 1208, and character animation 1210). The automated gif generation platform 124 replaces the character 1206 with character variant 1214, the background 1208 with the background variant 1212 to form the variant animated gif 1204.

Figure 13:
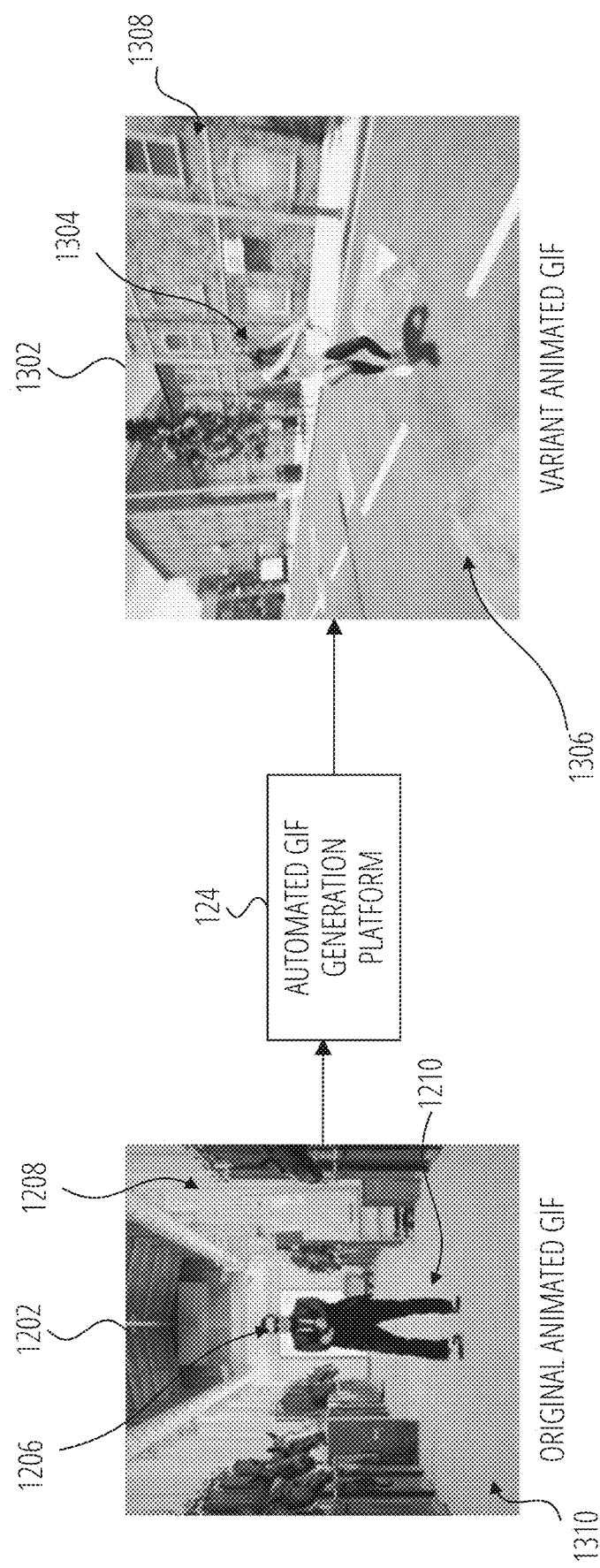
FIG. 13 illustrates an example of a variant GIF file in accordance with one example embodiment.

FIG. 13 illustrates an example of a variant GIF file in accordance with one example embodiment. The original animated GIF 1202 includes different elements/characteristics (e.g., character 1206, background 1208, character animation 1210, and perspective 1310). The automated gif generation platform 124 replaces the character 1206 with character variant 1304, the background 1208 with the background variant 1308, and the perspective 1310 with perspective variant 1306 to form the variant animated gif 1302.

Figure 14:
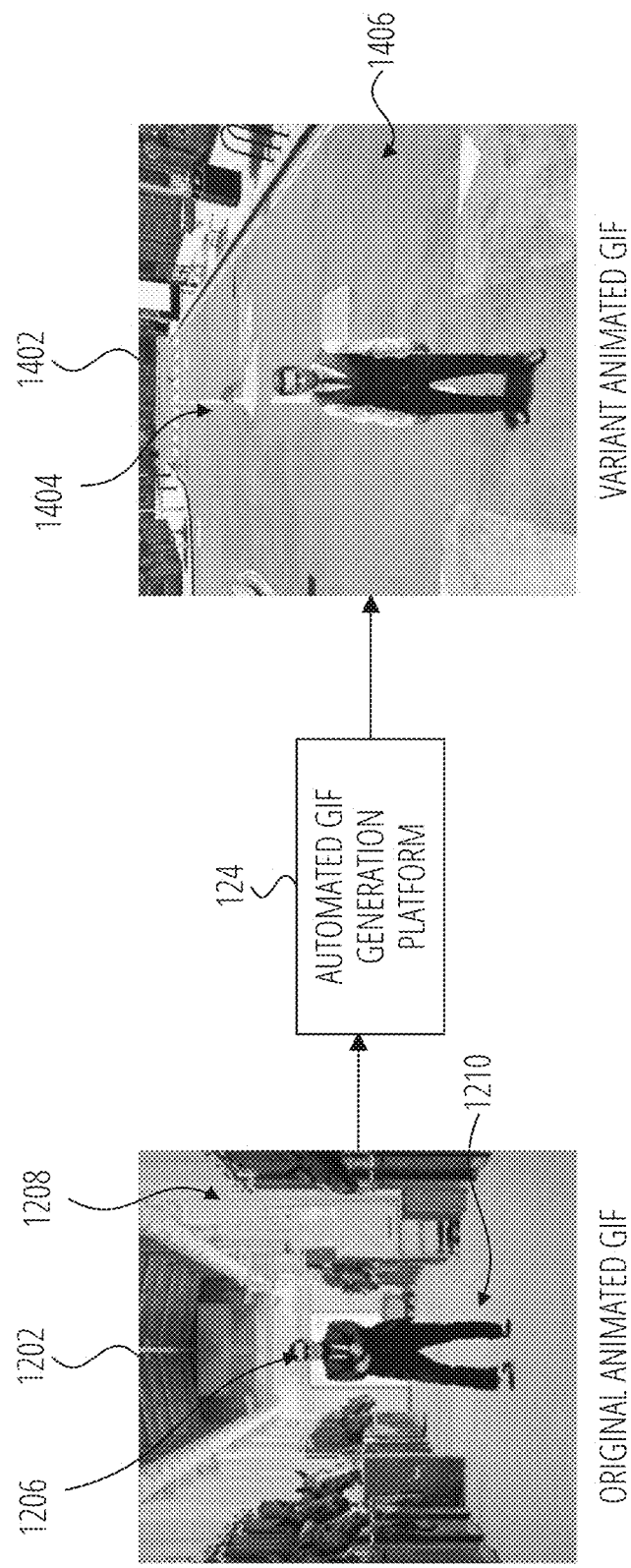
FIG. 14 illustrates an example of a variant GIF file in accordance with one example embodiment.

FIG. 14 illustrates an example of a variant GIF file in accordance with one example embodiment. The original animated GIF 1202 includes different elements/characteristics (e.g., character 1206, background 1208, and character animation 1210). The automated gif generation platform 124 replaces the character 1206 with AR effects 1404, the background 1208 with the background variant 1406 to form the variant animated gif 1402.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less all features of a single disclosed embodiment. Thus, the following claims are hereby incorporated into the Detailed Description, with each claim standing on its own as a separate embodiment.

EXAMPLES

Described implementations of the subject matter can include one or more features, alone or in combination as illustrated below by way of example.

Example 1 is a method comprising: accessing an animated GIF file; identifying a plurality of elements displayed in the animated GIF file; applying a variation of one or more elements to the animated GIF file; and generating a variant animated GIF file by applying the variation of the one or more elements to the animated GIF file.

Example 2 includes the method of example 1, further comprising: accessing messages from a communication platform; identifying a plurality of animated GIF files in the messages; measuring a trending metric for each animated GIF file based on a number of times each animated GIF file is shared on the communication platform within a predefined period of time; and identifying the animated GIF file having a highest trending metric within the predefined period of time.

Example 3 includes the method of example 1, further comprising: parsing the animated GIF file by applying a machine-learning program to the animated GIF file to identify the plurality of elements displayed in the animated GIF file.

Example 4 includes the method of example 1, wherein one of the plurality of elements comprises a visual environment element, a human model element, a camera trajectory element, an animation element, an augmented reality effect element, or a text element.

Example 5 includes the method of example 1, further comprising: identifying a first element displayed in the animated GIF file; and accessing a first variation of the first element from an element library corresponding to the first element, wherein applying the variation of the one or more elements comprises: applying the first variation to the first element of the animated GIF file, wherein generating the variant animated GIF file is based on the first variation of the first element of the animated GIF file.

Example 6 includes the method of example 1, further comprising: adding an augmented reality effect to the animated GIF file.

Example 7 includes the method of example 1, further comprising: publishing the variant animated GIF file on a communication platform; and measuring a trending metric of the variant animated GIF file based on a number of times the variant animated GIF file is shared on the communication platform within a predefined period of time.

Example 8 includes the method of example 1, further comprising: applying a combination of variations of one or more elements to the animated GIF file; generating a plurality of variant animated GIF files based on the combination of variations; publishing the plurality of variant animated GIF files on a communication platform; and measuring a trending metric of each published variant animated GIF file based on a number of times each published variant animated GIF file is shared on the communication platform within a predefined period of time; identifying the published variant animated GIF file with a highest trending metric; and identifying the combination of variations of the one or more elements of the identified published variant animated GIF file.

Example 9 includes the method of example 8, further comprising: accessing a first animated GIF file; applying the combination of variations of the one or more elements of the identified published variant animated GIF file to the first animated GIF file; and generating a second animated GIF file based on the applied combination of variations of one or more elements of the identified published variant animated GIF file to the second animated GIF file.

Example 10 includes the method of example 1, wherein identifying the plurality of elements displayed in the animated GIF file further comprises: identifying a plurality of variants of an element of the plurality of elements in the animated GIF file, wherein applying the variation of one or more elements to the animated GIF file further comprises: receiving a selection of a variant from the plurality of variants of the one or more elements and applying the selected variant to a corresponding element in the animated GIF file.

Example 11 is a computing apparatus comprising: a processor; and a memory storing instructions that, when executed by the processor, configure the apparatus to: access an animated GIF file; identify a plurality of elements displayed in the animated GIF file; apply a variation of one or more elements to the animated GIF file; and generate a variant animated GIF file by applying the variation of the one or more elements to the animated GIF file.

Example 12 includes the computing apparatus of example 11, wherein the instructions further configure the apparatus to: access messages from a communication platform; identify a plurality of animated GIF files in the messages; measure a trending metric for each animated GIF file based on a number of times each animated GIF file is shared on the communication platform within a predefined period of time; and identify the animated GIF file having a highest trending metric within the predefined period of time.

Example 13 includes the computing apparatus of example 11, wherein the instructions further configure the apparatus to: parse the animated GIF file by applying a machine-learning program to the animated GIF file to identify the plurality of elements displayed in the animated GIF file.

Example 14 includes the computing apparatus of example 11, wherein one of the plurality of elements comprises a visual environment element, a human model element, a camera trajectory element, an animation element, an augmented reality effect element, or a text element.

Example 15 includes the computing apparatus of example 11, wherein the instructions further configure the apparatus to: identify a first element displayed in the animated GIF file; and access a first variation of the first element from an element library corresponding to the first element, wherein apply the variation of the one or more elements comprises: applying the first variation to the first element of the animated GIF file, wherein generating the variant animated GIF file is based on the first variation of the first element of the animated GIF file.

Example 16 includes the computing apparatus of example 11, wherein the instructions further configure the apparatus to: add an augmented reality effect to the animated GIF file.

Example 17 includes the computing apparatus of example 11, wherein the instructions further configure the apparatus to: publish the variant animated GIF file on a communication platform; and measure a trending metric of the variant animated GIF file based on a number of times the variant animated GIF file is shared on the communication platform within a predefined period of time.

Example 18 includes the computing apparatus of example 11, wherein the instructions further configure the apparatus to: apply a combination of variations of one or more elements to the animated GIF file; generate a plurality of variant animated GIF files based on the combination of variations; publish the plurality of variant animated GIF files on a communication platform; and measure a trending metric of each published variant animated GIF file based on a number of times each published variant animated GIF file is shared on the communication platform within a predefined period of time; identify the published variant animated GIF file with a highest trending metric; and identify the combination of variations of the one or more elements of the identified published variant animated GIF file.

Example 19 includes the computing apparatus of example 18, wherein the instructions further configure the apparatus to: access a first animated GIF file; apply the combination of variations of the one or more elements of the identified published variant animated GIF file to the first animated GIF file; and generate a second animated GIF file based on the applied combination of variations of one or more elements of the identified published variant animated GIF file to the second animated GIF file.

Example 20 is a non-transitory computer-readable storage medium, the computer-readable storage medium including instructions that when executed by a computer, cause the computer to: access an animated GIF file; identify a plurality of elements displayed in the animated GIF file; apply a variation of one or more elements to the animated GIF file; and generate a variant animated GIF file by applying the variation of the one or more elements to the animated GIF file.

What is claimed is:

1. A method comprising:
    accessing an animated GIF file;
    identifying a plurality of elements displayed in the animated GIF file by applying a machine-learning program to the animated GIF file to identify the plurality of elements displayed in the animated GIF file, the machine-learning program comprising a visual environment machine learning application, a human model machine learning application, a camera trajectory machine learning application, an animation machine learning application, an augmented reality effect machine learning application, and a text machine learning application;
    applying a variation of one or more elements to the animated GIF file; and
    generating a variant animated GIF file by applying the variation of the one or more elements to the animated GIF file.

2. The method of claim 1, further comprising:
    accessing messages from a communication platform;
    identifying a plurality of animated GIF files in the messages;
    measuring a trending metric for each animated GIF file based on a number of times each animated GIF file is shared on the communication platform within a predefined period of time; and
    identifying the animated GIF file having a highest trending metric within the predefined period of time.

3. The method of claim 1, further comprising:
    parsing the animated GIF file by applying one of the visual environment machine learning application, the human model machine learning application, the camera trajectory machine learning application, the animation machine learning application, the augmented reality effect machine learning application, and the text machine learning application to the animated GIF file to identify the plurality of elements displayed in the animated GIF file.

4. The method of claim 1, wherein one of the plurality of elements comprises a visual environment element, a human model element, a camera trajectory element, an animation element, an augmented reality effect element, or a text element.

5. The method of claim 1, further comprising:
identifying a first element displayed in the animated GIF file; and
accessing a first variation of the first element from an element library corresponding to the first element,
wherein applying the variation of the one or more elements comprises: applying the first variation to the first element of the animated GIF file,
wherein generating the variant animated GIF file is based on the first variation of the first element of the animated GIF file.

6. The method of claim 1, further comprising:
training a visual environment machine learning model with the visual environment machine learning application;
training a human model machine learning model with the human model machine learning application;
training a camera trajectory machine learning model with the camera trajectory machine learning application;
training an animation machine learning model with the animation machine learning application;
training an augmented reality effect machine learning model with the augmented reality effect machine learning application;
training a text machine learning model with the text machine learning application; and
training a variant element combination machine learning model with a variant element combination machine learning application, the variant element combination machine learning model being trained to identify combinations of elements variations of top trending variants.

7. The method of claim 1, further comprising:
publishing the variant animated GIF file on a communication platform; and
measuring a trending metric of the variant animated GIF file based on a number of times the variant animated GIF file is shared on the communication platform within a predefined period of time.

8. The method of claim 1, further comprising:
applying a combination of variations of one or more elements to the animated GIF file;
generating a plurality of variant animated GIF files based on the combination of variations;
publishing the plurality of variant animated GIF files on a communication platform;
measuring a trending metric of each published variant animated GIF file based on a number of times each published variant animated GIF file is shared on the communication platform within a predefined period of time;
identifying the published variant animated GIF file with a highest trending metric; and
identifying the combination of variations of the one or more elements of the identified published variant animated GIF file.

9. The method of claim 8, further comprising:
accessing a first animated GIF file;
applying the combination of variations of the one or more elements of the identified published variant animated GIF file to the first animated GIF file; and
generating a second animated GIF file based on the applied combination of variations of one or more elements of the identified published variant animated GIF file to the second animated GIF file.

10. The method of claim 1, wherein identifying the plurality of elements displayed in the animated GIF file further comprises: identifying a plurality of variants of an element of the plurality of elements in the animated GIF file,
wherein applying the variation of one or more elements to the animated GIF file further comprises: receiving a selection of a variant from the plurality of variants of the one or more elements and applying the selected variant to a corresponding element in the animated GIF file.

11. A computing apparatus comprising:
a processor; and
a memory storing instructions that, when executed by the processor, configure the apparatus to:
access an animated GIF file;
identify a plurality of elements displayed in the animated GIF file by applying a machine-learning program to the animated GIF file to identify the plurality of elements displayed in the animated GIF file, the machine-learning program comprising a visual environment machine learning application, a human model machine learning application, a camera trajectory machine learning application, an animation machine learning application, an augmented reality effect machine learning application, and a text machine learning application;
apply a variation of one or more elements to the animated GIF file; and
generate a variant animated GIF file by applying the variation of the one or more elements to the animated GIF file.

12. The computing apparatus of claim 11, wherein the instructions further configure the apparatus to:
access messages from a communication platform;
identify a plurality of animated GIF files in the messages;
measure a trending metric for each animated GIF file based on a number of times each animated GIF file is shared on the communication platform within a predefined period of time; and
identify the animated GIF file having a highest trending metric within the predefined period of time.

13. The computing apparatus of claim 11, wherein the instructions further configure the apparatus to:
parse the animated GIF file by applying one of the visual environment machine learning application, the human model machine learning application, the camera trajectory machine learning application, the animation machine learning application, the augmented reality effect machine learning application, and the text machine learning application to the animated GIF file to identify the plurality of elements displayed in the animated GIF file.

14. The computing apparatus of claim 11, wherein one of the plurality of elements comprises a visual environment element, a human model element, a camera trajectory element, an animation element, an augmented reality effect element, or a text element.

15. The computing apparatus of claim 11, wherein the instructions further configure the apparatus to:
identify a first element displayed in the animated GIF file; and
access a first variation of the first element from an element library corresponding to the first element, wherein apply the variation of the one or more elements comprises: applying the first variation to the first element of the animated GIF file,
wherein generating the variant animated GIF file is based on the first variation of the first element of the animated GIF file.

16. The computing apparatus of claim 11, wherein the instructions further configure the apparatus to:
train a visual environment machine learning model with the visual environment machine learning application;
train a human model machine learning model with the human model machine learning application;
train a camera trajectory machine learning model with the camera trajectory machine learning application;
train an animation machine learning model with the animation machine learning application;
train an augmented reality effect machine learning model with the augmented reality effect machine learning application;
train a text machine learning model with the text machine learning application; and
train a variant element combination machine learning model with a variant element combination machine learning application, the variant element combination machine learning model being trained to identify combinations of elements variations of top trending variants.

17. The computing apparatus of claim 11, wherein the instructions further configure the apparatus to:
publish the variant animated GIF file on a communication platform; and
measure a trending metric of the variant animated GIF file based on a number of times the variant animated GIF file is shared on the communication platform within a predefined period of time.

18. The computing apparatus of claim 11, wherein the instructions further configure the apparatus to:
apply a combination of variations of one or more elements to the animated GIF file;
generate a plurality of variant animated GIF files based on the combination of variations;
publish the plurality of variant animated GIF files on a communication platform;
measure a trending metric of each published variant animated GIF file based on a number of times each published variant animated GIF file is shared on the communication platform within a predefined period of time;
identify the published variant animated GIF file with a highest trending metric; and
identify the combination of variations of the one or more elements of the identified published variant animated GIF file.

19. The computing apparatus of claim 18, wherein the instructions further configure the apparatus to:
access a first animated GIF file;
apply the combination of variations of the one or more elements of the identified published variant animated GIF file to the first animated GIF file; and
generate a second animated GIF file based on the applied combination of variations of one or more elements of the identified published variant animated GIF file to the second animated GIF file.

20. A non-transitory computer-readable storage medium, the computer-readable storage medium including instructions that when executed by a computer, cause the computer to:
access an animated GIF file;
identify a plurality of elements displayed in the animated GIF file by applying a machine-learning program to the animated GIF file to identify the plurality of elements displayed in the animated GIF file, the machine-learning program comprising a visual environment machine learning application, a human model machine learning application, a camera trajectory machine learning application, an animation machine learning application, an augmented reality effect machine learning application, and a text machine learning application;
apply a variation of one or more elements to the animated GIF file; and
generate a variant animated GIF file by applying the variation of the one or more elements to the animated GIF file.

* * * * *